April 29, 1958 J. C. GABRIEL 2,832,252
MUSIC SLIDE RULE
Filed Sept. 12, 1955 4 Sheets-Sheet 4

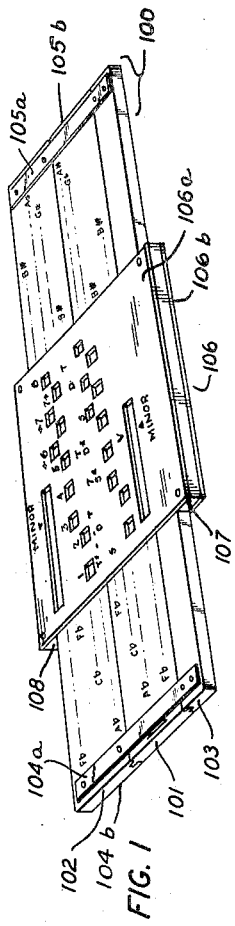

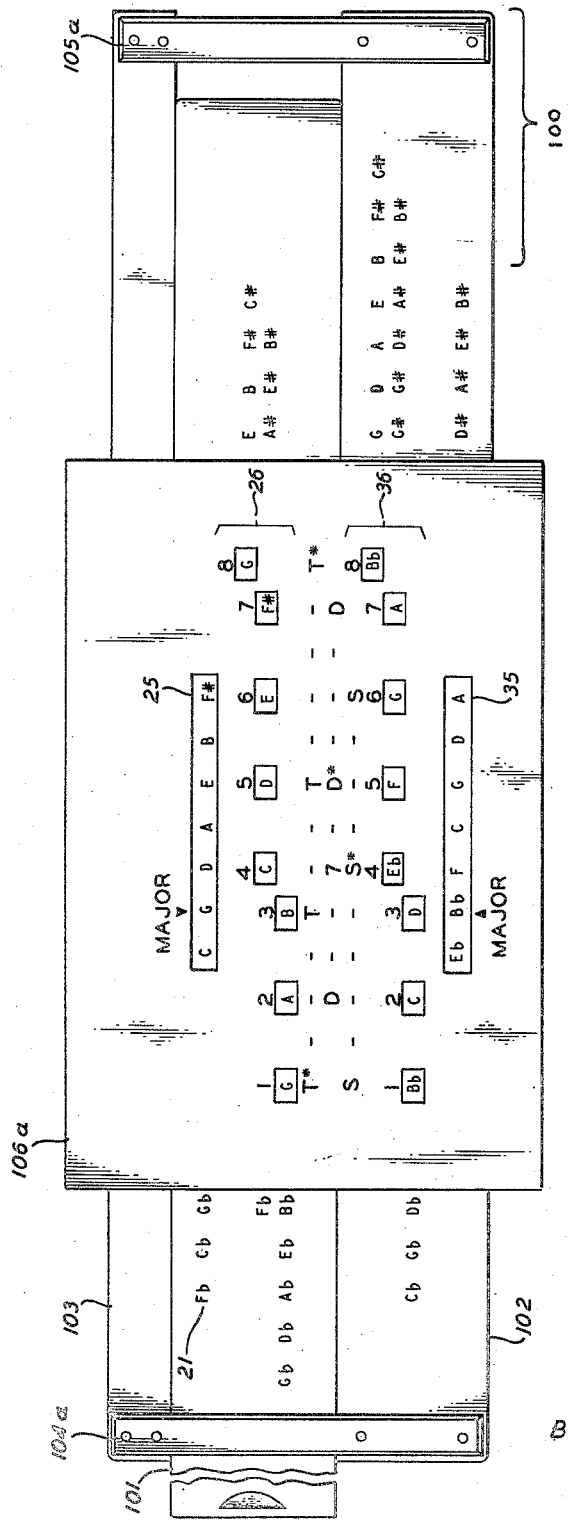

INVENTOR
J. C. GABRIEL
BY Martha L. Pugh
AGENT

United States Patent Office 2,832,252
Patented Apr. 29, 1958

2,832,252

MUSIC SLIDE RULE

John C. Gabriel, Morristown, N. J.

Application September 12, 1955, Serial No. 533,656

4 Claims. (Cl. 84—480)

This invention relates to a hand-operated device for presenting data relating to musical theory, such as scale degrees and their harmonic relationships in a readily usable form for the transposition, composition or study of music. More particularly, the invention relates to a music slide rule.

During the past few years several different types of music slide rules have been described in the literature, some of which are available for sale. One type takes the form of a pair of disks which can be manually rotated with respect to each other, to reveal through windows in the outer surface a series of chords on the inner surface corresponding to harmonic relationships in different keys. Another type of music slide rule takes the form of a long, rectangular rule having inscribed on its surface a large amount of information relating to harmonic intervals and the major and minor scale degrees. A central portion indicating the scale degrees and other harmonic information is movable laterally with respect to the edge portions on which are inscribed the alphabetical musical characters, in alternation with spaces which include simultaneously both sharp and flat indications. Other arrangements are also available which present harmonic data in such a form as to be accessible to sliding or rotating scales or indicators.

In transposition from one key to another, or in determining harmonic relationships, prior art music slide rules, such as those described in the foregoing paragraphs, have been found lacking in certain important features. For example, none of these devices displays the degrees of the scale representing a particular key, exclusive of intervening material which is irrelevant. Moreover, with these prior art devices, it is not possible to compare the signatures or scale degrees in two or more keys. Moreover, there is no correlative display of the key signature and the related scales, and no discrimination between flats and sharps as traditionally used in the individual scales. Further, none of the prior art devices described discriminates between sharps and flats in showing the traditional marking of accidentals characterizing, for example, the melodic minor scale. Furthermore, in the prior art devices, the major and corresponding relative minor scale degrees are not shown simultaneously so that the relationship is evident.

Accordingly, it is the principal object of the present invention to significantly improve the construction and operation of music slide rules. More particular objects of the invention are to clearly present the scale degrees of the traditionally known scales to the exclusion of irrelevant characters, and to provide means for comparing the scale degrees and other harmonic information in different keys. A further object of the invention is to provide for the proper discrimination between sharps and flats, in transposing from one key to another in written compositions. Another object of the invention is to provide a music slide rule on which the major scale degrees and those of the relative minor are displayed simultaneously for each of the successive keys. Still another, more specific, object of the invention is to provide a music slide rule which is more compact and simpler to operate than known devices of the prior art.

These and other objects of the invention are realized in a music slide rule which, in preferred embodiment, assumes the physical form of the standard duplex mathematical slide rule. On both the fixed and movable portions of the rule are inscribed identical, laterally extended series of alphabetical musical characters. The series on one side relate to the major keys, and those on the opposite side, to the minor keys. A large rectangular cursor comprising a pair of masks, one adjacent each side, slides laterally over the surface of the rule including both the fixed and movable portions thereof. Each mask contains a pair of elongated windows adjacent to and parallel with its upper and lower edges. These windows indicate the particular keys under observation and their respective signatures, those on each face of the rule being identical when the movable portion is in its rest position with respect to the fixed portion of the rule.

Between the elongated signature windows in each of the aforesaid masks are two identical, laterally extended series of small openings, one above the fixed portion of the rule and the other above the movable portion of the rule. Each series has the individual small openings thereof spaced to reveal the scale degrees of the selected keys. The principal chords in each key are also indicated by means of markers associated with specific ones of the small openings revealing the scale degrees.

In accordance with a preferred form of the invention, the cursor is constructed to have corresponding openings in the two masks which respectively reveal the degrees of the major scales on both the fixed and movable portions of one side of the rule, and the relative minor scales on the corresponding portions of the other side of the rule.

A particular feature of the invention is that it gives correct written indication of the half-tones in a selected scale, distinguishing between sharps and flats, so that each scale appears in the manner in which it is traditionally written. This has an advantage in transposition of written music from one key to another in that one is readily able to distinguish between those sharps or flats which are related to the key signature, and written accidentals. Moreover, the mixed sharps and flats which characterize the ascending and descending melodic minor scale are indicated correctly.

Another feature of the invention is the ease with which the movable portion, or slide is used for transposing from one key to another. For example, the indicator can be set on a selected key which may be the key to be transposed. The slide is then set on the key to which it is desired to make the transposition. Corresponding musical designations, one beneath the other, may then be simply read off of the rule. A still further advantage of the slide rule in the disclosed preferred embodiment is that it reveals on one side the scale degrees and signatures of two selected keys while revealing on the reverse side the scale degrees and signatures of their respective relative minors.

These and other objects, features and advantages of the present invention will be better understood from the detailed description hereinafter with reference to the attached drawings, in which:

Fig. 1 shows in preferred form the physical structure of the slide rule of the present invention;

Fig. 2A is a reproduction of the arrangement of characters to be inscribed on one side of the rule which will reveal the scale and chord structure of the major keys;

Figure 3A:
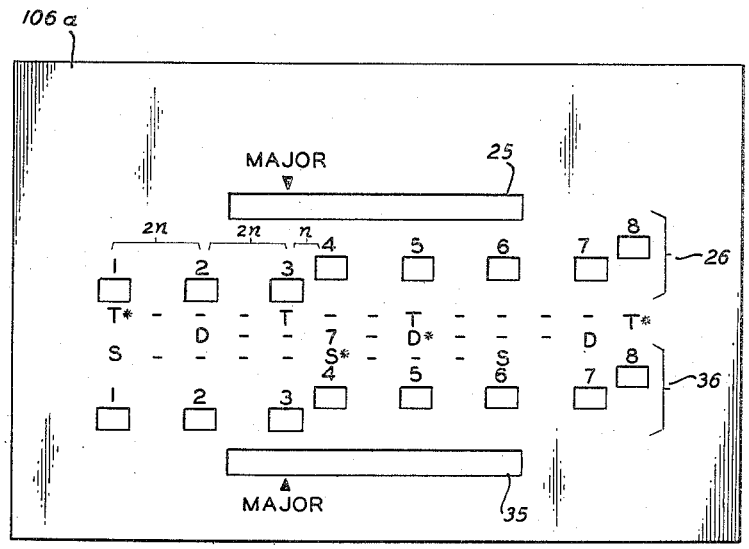
Figure 3B:
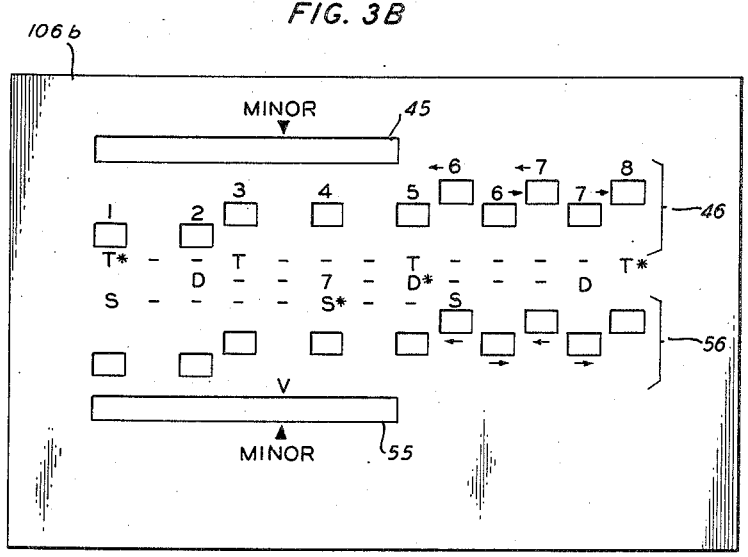
Figure 4B:
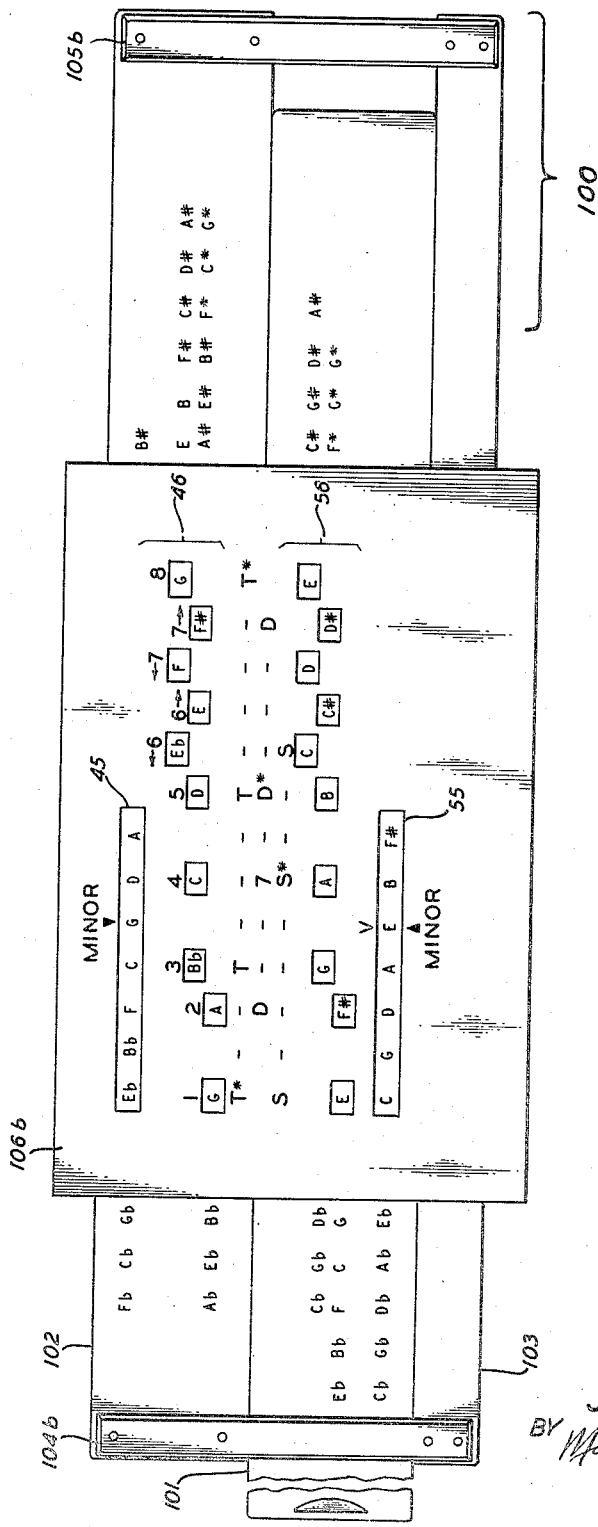

Fig. 2B, which shows the other side of the rule seen in Fig. 1, is a reproduction of the arrangement of characters inscribed on the reverse side of the rule which will reveal the scale and chord structure of the corresponding minor keys;

Fig. 3A shows, in a preferred form of the invention, the mask 106a adapted to reveal the scale degrees and signatures relating to the major keys, and Fig. 3B shows the mask 106b adapted to reveal the scale degrees and signatures of the minor keys;

Fig. 4A and Fig. 4B, respectively, show the completely assembled parts of a preferred form of the slide rule of the present invention adapted to reveal scale degrees and key signatures relating to the major keys on one side and the minor keys on the other side.

It has been found that the principles of the present invention can be applied most simply to a physical structure, the basic elements of which are similar in construction to the well known duplex slide rule. Such a combination is shown in Fig. 1 of the drawings. This includes a pair of identical flat rectangular elements 101 and 102 of wood, plastic, or the like, each about 13 inches long, 1 5/16 inches wide and 5/16 inch thick. Element 101, hereinafter referred to as the "slide," has a flange on each of its long edges, one of which fits into and slides along a slot in the corresponding long edge of element 102. For further stability, a third flat rectangular element 103 is added, coextensive with, and of the same thickness as the other two, but only about ½ inch wide. The element 103 is slotted on its long edge to accommodate the flange along the other long edge of element 101, so that the latter is slidably mounted between elements 102 and 103. The assemblage of elements 101, 102, and 103 is held together by rectangular end plates 104a and 105a on one side, and corresponding members 104b and 105b on the other side, which are screwed to elements 102 and 103, allowing element 101 to move freely in a lateral direction. Fig. 1 shows the rule with the slide 101 in what will hereinafter be referred to as the "rest position."

Slidably mounted on the upper and lower surfaces of the rule, extending over both the fixed and movable portions thereof, is a cursor 106 comprising a pair of slotted masks 106a and 106b, which are spaced apart by and attached to two narrow strips 107 and 108, which serve to hold the masks in constant relationship to each other.

It will be apparent that there are numerous physical arrangements adapted to the practice of the principles of the present invention, other than the form described in the preceding paragraphs with reference to Fig. 1, which is merely illustrative.

A preferred arrangement of the legends to be inscribed on both the fixed and movable portions of the slide rule of the present invention is indicated in Figs. 2A and 2B of the drawings.

The present invention relies in principle on the harmonic structures of the scales, both major and minor, which are respectively formed by different prescribed sequences of whole tones and half tones repeated in each of the major and minor keys.

For definition of musical terms used in this specification and the appended claims, the reader is referred to "Harmony" by Walter Piston, W. W. Norton and Co., Revised Edition, 1948.

Starting with the tonic in each major key, the ascending major scale is made up of the following tone sequence:

Whole-whole-half-whole-whole-whole-half

The descending scale is composed of the same intervals in reverse order. Correspondingly, starting with the tonic, each melodic minor scale is made up of the following tone sequences: in the ascending direction, Whole-half-whole-whole-whole-whole-half and in the descending direction, Whole-whole-half-whole-whole-half-whole In the case of the harmonic minor, the ascending arrangement is as follows:

Whole-half-whole-whole-half-(one-and-a-half)-half

The descending scale is composed of the same steps in reverse order.

Particular arrangements of alphabetical musical characters, such as indicated in Figs. 2A and 2B have been discovered, in accordance with the present invention, to facilitate the successive selection of tones in each of the different keys which bear the relationships shown above. The selection of a particular set of tones from one of the arrangements shown in Figs. 2A and 2B, and their display in a given order, corresponding to a selected major or minor scale, is carried out by a cursor consisting of a pair of masks, shown in Figs. 3A and 3B. The cursor unit 106 which is movable in a lateral direction holds the masks 106a and 106b over the upper and lower faces of the rule 100. The two sides of the complete assembly of the rule, including the cursor, are shown in Figs. 4A and 4B, which together with the masks will be described in detail at a later point.

Referring now to Fig. 2A, there is shown a first series 20 comprising four parallel lines of alphabetical musical characters, which are inscribed on the slide or movable portion 101 of the rule, and a second identical configuration 30 which is inscribed on the fixed portion 102 of the rule. Both of these series relate to the major keys.

Assuming the rule to be in a horizontal position, as indicated, the alphabetical musical characters in each of the parallel lines comprising the series 20 and 30 are arranged from left to right in order of ascending perfect fifths, the individual characters being spaced apart, uniformly from one another, a distance "n" in a lateral direction, as indicated in Fig. 2A.

The first line of characters, 21, which lies adjacent to the long outside edge of the fixed element 101, commences on the left hand end of the rule with $F_b$, and progresses by successtive perfect fifths to B# on the right hand end. Near the lower long edge of the slide 101 an identical line 31 is disposed in a position such that the characters are substantially vertically aligned with the characters of line 21, when the slide 101 is in the position shown in Figs. 1, 2A and 2B, hereafter referred to as "the rest position."

A second line of characters 22, parallel with and located a short vertical distance below line 21, commences with the character $F_b$, which is vertically aligned with the character C of the line 21, and progresses by perfect fifths to C# at the extreme right hand end of slide 101.

In the series 30, assuming the slide 101 to be in the rest position, a line of characters 32 is identical with and has its characters in vertical alignment with those of the line 22.

A third parallel line of characters 23, of series 20, begins at the left with $F_b$, aligned with $G_b$ in line 21, and progresses by perfect fifths to B#.

Series 30 includes a line 33 which is identical and has characters aligned with those of the line 23 in series 20.

Series 20 includes a fourth line 24 which commences at the extreme left hand end with $C_b$, three spaces to the left of $F_b$ in line 21 so that the fourth character $A_b$ in line 24 is in vertical alignment with the first character $F_b$ of line 21. Line 24 extends to B# at the right hand end of the rule, below F# in the line 23 above.

Series 30 contains a fourth line 34 which, in the rest position of the rule, matches line 24 in series 20.

On the reverse side of the rule is a somewhat similar configuration of alphabetical characters related to the minor keys. These are indicated in Fig. 2B of the drawings, which shows series 40, which is inscribed on the fixed element 102 of the slide rule; and the correlative series 50, which is inscribed on the movable element 101 thereof.

In Fig. 2B series 40 and 50, in the manner of the previously described series 20 and 30, each comprises four parallel lines, consisting of uniformly spaced alphabetical characters, arranged from left to right in order of ascending perfect fifths, and separated laterally from one another by space intervals $n$.

The uppermost line 41, adjacent to the upper edge of the fixed element 102, and the lowermost line 51, adjacent to the lower edge of the movable element 101, each commences with $F_b$ on the extreme left hand end, and progresses by perfect fifths to B# on the right hand end.

Lines 42 and 52 each commences at the left hand end with $F_b$, vertically aligned with C in line 41 above, and extends to A# on the right hand end.

Similarly, each of lines 43 and 53 begins with $C_b$ at the left hand end which is aligned with $D_b$ in the line 41 above, and extends to G* (G double sharp) which is aligned with D# in line 42 above. Correlative line 53 of series 50 has identical characters and arrangement to line 43.

The lines 44 and 54 extend from $A_b$, vertically aligned with $F_b$ of line 41 at the extreme left hand end of the rule to B# at the right hand end, the latter being aligned with G# in the line 41.

It will be noted, that whereas the characters in each of the lines 22, 23, 24, are arraged from left to right, in order of ascending perfect fifths, they are also arranged, as indicated in the drawings, to form vertical columns, in which the characters are arranged, from bottom to top, in order of ascending diminished fifths. Likewise, the same relationship exists between lines 32, 33, 34, between lines 42, 43, 44 and between lines 52, 53, 54.

Figs. 3A and 3B of the drawings respectively show the two sides of cursor 106 comprising selective masks 106a and 106b mentioned hereinbefore, the mask shown in Fig. 3A corresponding to the major keys, and the mask shown in Fig. 3B corresponding to the minor keys. As also indicated previously, the cursor 106 is slidably mounted on the rule so that the masks 106a and 106b are simultaneously moved over the respective upper and lower surfaces of the rule, as indicated in Figs. 4A and 4B, which show the rule with the cursor 106 in a selected illustrative position.

The function of the masks 106a and 106b, as will be indicated in detail hereinafter, is to select sets of characters from the series inscribed on the faces of the rule which have certain specified relationships. For example, as indicated in the description with reference to Figs. 2A and 2B, the characters in each horizontal row are arranged from left to right in order of ascending perfect fifths. Moreover, the characters in rows 22, 23, 24, in series 20, in rows 32, 33, 34, in series 30, and in the corresponding rows in series 40 and 50, form columns, the successive characters of which are arranged from bottom to top in order of ascending diminished fifths.

Hence, in the individual rows the musical interval between any two alternate characters from left to right is, in each case, an octave plus a whole tone, and may be used, therefore, to represent an ascending whole tone. Moreover, in any two adjacent rows of the series indicated above, the musical interval between two characters which are diagonally adjacent, moving in a direction up and to the right, is an octave plus a semitone, and may, therefore, be used to represent a semitone.

The mask 106a, shown in Fig. 3A, which corresponds to the major keys, contains a pair of elongated openings 25 and 35 which are respectively aligned with the lines 21 and 31, indicated in Fig. 2A. These are long enough, in each case, to reveal seven characters simultaneously as shown in Fig. 4A. A marker on the outside edge of each of the aforesaid elongated openings 25 and 35 points to the second character from the left hand end thereof, indicating the key selected for observation.

Between the two elongated openings 25 and 35 are disposed two separate, substantially identical configurations of small openings, 26 and 36 respectively. Each small opening of the groups 26 and 36 is large enough to reveal one alphabetical character at a time. Each of these two configurations of openings, 26 and 36, corresponds in number and lateral distribution to the tones on the major scale. The group of openings 26 is disposed to reveal simultaneously selected characters of the lines 21, 22, and 23, on the slide portion 101 of the rule. Correspondingly, the openings 36, which are in vertical alignment with the openings 26, are disposed to reveal characters from each of lines 31, 32, and 33 on the fixed portion 102 of the rule. Identical characters are revealed by each of the series 26 and 36 when the slidable portion 101 of the rule is in rest position.

The first three openings 1, 2, and 3 of the series 26 are aligned to reveal selected characters in the line 24. It will be noted that the lateral distance between openings 1 and 2, and between openings 2 and 3, approximates, in each case, $2n$, so that alternate characters in the line 24 are successively revealed in windows 1, 2 and 3. As previously indicated, the characters in line 24 are arranged from left to right in order of ascending major fifths. Hence, since two successive openings are separated by two major fifths, or an octave plus a whole tone, successive characters revealed by openings 1, 2, and 3 ascend by whole tones for any position of the mask. The next four openings 4, 5, 6, and 7 are slightly above openings 1, 2, and 3, in a vertical direction, so as to reveal successive characters in line 23. The lateral distance between openings 4 and 5, 5 and 6, 6 and 7, is, in each case, $2n$, so that successive characters of line 23 which are revealed by the openings 4, 5, and 6, also ascend by whole tone steps. A single opening 8 is aligned to reveal one character in the upper line 22. As noted, the lateral spacing between the openings 3 and 4, and 7 and 8, of the series 26, is equal to $n$ in each case. Inasmuch as the second opening of each of the aforesaid pairs is in the row above, as indicated in the drawing, the characters revealed in the successive openings will be in half-tone steps.

The characters revealed by the successive openings 1 to 8 in the series 26 are seen to follow the pattern of the steps in the major scale, $$2n, 2n, n, 2n, 2n, 2n, n$$

the smaller separations corresponding to half-tone steps in the scale.

In a like manner, the substantially identical series of openings 30 is arranged to reveal corresponding characters in the lines 34, 33, and 32 on the fixed part 103 of the rule.

On the reverse side 106b of the cursor 106 a similar pattern of openings has been followed, corresponding to the minor keys. The elongated openings 45 and 55 are, like the openings 25 and 35 previously described, positioned to reveal, simultaneously, seven consecutive characters in each of the lines 41 and 51, respectively adjacent the upper and lower long edges of the rule. An indicating mark at each of the elongated openings 45 and 55 points to the fifth character from the left hand end thereof.

In a manner similar to that previously described with reference to mask 106a, on one side of the cursor, two identical configurations of small openings 46 and 56 are respectively disposed on the opposite side corresponding to mask 106b to reveal characters of the series 40 and 50 in arrangements corresponding to the harmonic and melodic minor scales. Openings 1 and 2, in each of series 46 and 56, for example, are respectively aligned to move over lines 44 and 54. It will be noted that these two openings are spaced apart laterally, a distance $2n$, representing a whole tone step. Likewise two sets of openings 3, 4, 5, 6 and 7 (ascending) which are aligned with the lines 43 and 53 respectively, are also spaced apart a lateral distance of $2n$, representing whole tone steps. Openings 8 are respectively aligned with the lines 42 and 52.

In the descending melodic minor which differs from the ascending scale, openings 8, 7, and 6, which are all aligned with lines 42 and 52 respectively, are laterally separated by space intervals approximating $2n$, representing whole scale steps.

The harmonic minor scale, which is the same ascending and descending, is indicated in sequence by observing the characters in windows 1 to 5, window 6 with the arrow to the left, window 7 with arrow to the right, and window 8.

It will be noted that the separations between steps 2 and 3 in both the ascending and descending scales, between 7 and 8 in the ascending scale, and between 6 and 5 in the descending scale, have lateral spacings of $n$, indicating, in each case, a half-tone step.

Thus, in each case, it is apparent that the lateral spacing of the openings corresponds to the distribution of whole and half tone steps in the scale under observation.

In preferred form, the correlative openings on both sides 106a and 106b of the cursor 106, and also the respective configurations shown in Figs. 2A and 2B, are so related that when the pointers respectively associated with the openings 25 and 35 on one side of the rule select a given major key for observation, the corresponding pointers associated with the openings 45 and 55 on the reverse side of the rule, select, in each case, the relative minor thereof.

For example, if the marker adjacent opening 35, Fig. 4A on the fixed portion 102 of the rule selects the $B_b$ major scale for observation, then the marker adjacent opening 45, Fig. 4B on the reverse face of the fixed portion 102 will simultaneously indicate the G minor scale, which is the relative minor.

A similar relationship exists, in the preferred form of the rule between the characters revealed by the openings 25 and 55, on alternate sides of the movable portion 101.

In addition to the openings described, which correspond to the major keys on one side, and the minor keys on the other side of the cursor 106, a series of markings, adjacent selected ones of the openings of the series 26, 36, 46, and 56, indicate the principal chords related to each of the scales. For example, the letter "T" is adjacent openings 1, 3 and 5. These represent the notes of the tonic chord in each key. In each case, a star indicates the root or fundamental note of the chord. In the case of the tonic chord, for example, the star is placed after the "T" adjacent opening 1. In a similar manner, the subdominant chord is indicated by a letter "S" opposite openings 1, 4, and 6 the root being opening 4; and the dominant chord is indicated by the letter "D" opposite openings 2, 4, 5 and 7, the root in this case being opening 5. The inclusion of the "7" opposite the window 4 indicates that addition of this note to the triad forms the dominant 7th chord. In a like manner, notations on the reverse side of the mask, as indicated in Fig. 3B, show the chords in the relative minor keys.

For the purposes of illustration, assume that it is desired to ascertain data relating to the $B_b$ major scale.

The rule is turned to the side marked "major" on the side 106a of the cursor 106 as indicated in Fig. 4A. Let us assume that the slider 101 is in the position shown. The marker on the lower elongated window 35 is set opposite $B_b$. The seven characters revealed in the window 35 include $E_b$ and $B_b$, which accordingly indicate the signature of the $B_b$ major scale. Appearing now in succession in the openings 1 through 8 of the series 36, are the degrees of the major scale in the key of $B_b$. The tonic chord in this key is now indicated by the letter "T" which is aligned with the windows 1, 3, 5 and 8 in series 36 revealing the notes $B_b$, D, F and $B_b$. The asterisks after the "T" adjacent the windows 1 and 8 indicate that this is a $B_b$ chord. In a similar manner the dominant chord in the key of $B_b$ is indicated by the letter "D" in front of windows 2, 5, and 7 in the series 36, revealing the notes C, F and A corresponding to the dominant chord in the key of $B_b$, the asterisk indicating this to be an F chord. The figure 7 adjacent to the fourth window, indicates that the addition of $E_b$ makes this a dominant 7th chord. In a similar manner the subdominant chord of the same key is indicated by the letter "S" adjacent to windows 1, 4 and 6 revealing the notes $B_b$, $E_b$ and G, the asterisk indicating that this is an $E_b$ chord.

With the cursor remaining in the position set as described in the preceding paragraph, the rule is turned over to the side marked "minor," as indicated in Fig. 4B. It will be noted that the fixed portion 102 of the rule now appears on top. The marker opposite the upper elongated window 45 points to G, indicating that G minor is the relative minor of the key of $B_b$ major. By using the lower set of windows 36 on the "major" side 106a of the cursor 106, and the upper set 46 on the "minor" side 106b of the cursor 106, both sets of openings will uncover correlated characters on the fixed part 102 of the rule, and so indicate relative major and minor keys independently of the position of the slide 101, the manipulation and use of which is explained in a later paragraph.

In the case of the melodic minor scale in the key of G minor, the arrows above windows 6 and 7 of which it is seen there are two sets, indicate that in the ascending scale the notes E and F# are included, and in the descending scale, these are replaced by F and $E_b$. The elongated window 45 reveals simultaneously seven characters including $B_b$ and $E_b$ indicating the signature to be the same as that of the relative major key on the other side of the rule. It will be apparent that in the case of the harmonic minor scale the E (natural) and F# shown in window 6 and window 7 with arrows to the right must be written into the music as accidentals, since these do not agree with the signature.

From Fig. 4B, it will be seen that the chords in the minor keys are found in the manner described with reference to the major keys on the reverse side of the rule. For example, in the key of G minor as indicated by the letter "T" before openings 1, 3 and 5, the chord consists of G, $B_b$ and D, G being the root as indicated by the asterisk. In a similar manner the notes indicated by the letter "S," and those indicated by the letter "D," show that the subdominant chord is a C minor chord, and the dominant chord is a D seventh chord, the latter containing the same components as the D seventh chord shown on the major side of the rule in the key of G major.

When the sliding element 101 of the rule is utilized in making transpositions from one key to another, such as, for example from $B_b$ major to G major, the face 106a of cursor 106 is set so that the index is adjacent $B_b$ in the elongated lower window 35. The sliding portion 101 of the rule is then moved laterally until G appears opposite the marker adjacent the elongated upper window 25 as shown in Fig. 4A. Simultaneously, the window 25 reveals F#, the signature of the new key. The upper set of windows 1 to 8 of the series 26 reveals, in succession, the degrees of the scale of G major; whereas the lower set of windows 1 to 8 of the series 36 reveals, in succession, the degrees of the scale of $B_b$ major. Turning the rule to the other side (shown in Fig. 4B) so that the elongated window 45 in the face 106b of the mask 106 appears above, and the elongated window 55 appears below, it will be seen that the relative minor of $B_b$ major, indicated in the window 45 on the fixed scale 102 is G minor; likewise, the relative minor of G major as indicated in the lower elongated window 55 adjacent the slide 101 is E minor. It will be apparent that transposition can be made directly from one major key to another using the series of openings 26 and 36 on one side of the rule; or alternatively, from one minor key to another using the correlative openings 46 and 56 on the reverse side of the rule.

It will be apparent that although a specific form of music slide rule has been described herein in order to illustrate the principles of the present invention, numerous variations of this form, within the scope of the appended claims, will readily occur to those skilled in the art.

What is claimed is:

1. A transposing slide rule comprising a pair of juxtaposed relatively movable members, each having a face in a common plane and having thereon symbols representing the notes of a chromatic scale, a slide member movable along and superposed thereover, said slide member having two series of substantially identical openings therethrough each located over a movable member and revealing therethrough in any position thereof the symbols of a diatonic scale, the particular scales depending upon the relative positions of the movable members and the position of the slider with respect thereto.

2. A transposing slide rule in accordance with claim 1 wherein the symbols representing the notes of the chromatic scale are substantially identically arranged on each of said faces to form three parallel lines extending in one direction, and a series of equally spaced columns in a transverse direction, the notes in said lines progressing by perfect fifths in said one direction, and the notes in said columns progressing by diminished fifths in said transverse direction.

3. A transposing slide rule in accordance with claim 2 wherein each substantially identical series of openings in said slide member has a lateral distribution which is a function of the tonal structure of a selected diatonic scale, and wherein said series comprises a first set of openings aligned to reveal selected alternate characters in a first one of said parallel lines, and a second set of openings aligned to reveal selected alternate characters in a second one of said lines, and at least one opening of a third set, aligned to reveal at least one character in a third one of said parallel lines.

4. A combination in accordance with claim 1 wherein said juxtaposed relatively movable members have a pair of faces in each of two common parallel planes, each of said pairs of faces having thereon symbols representing the notes of a chromatic scale, and wherein each said slide member comprises two masks which are respectively movable along in fixed relationship and which are respectively superposed over each of said pairs of faces simultaneously, each of said masks having two series of openings therethrough which are constructed and arranged to reveal major scales on the pair of faces on one side of said rule simultaneously with the respective relative minor scales on the pair of faces on the other side of said rule.

References Cited in the file of this patent

UNITED STATES PATENTS

| | | |
|---|---|---|
| 1,014,344 | Smith | Jan. 9, 1912 |
| 2,332,842 | Champion | Oct. 26, 1943 |
| 2,657,610 | Carran | Nov. 3, 1953 |